Patented July 8, 1947

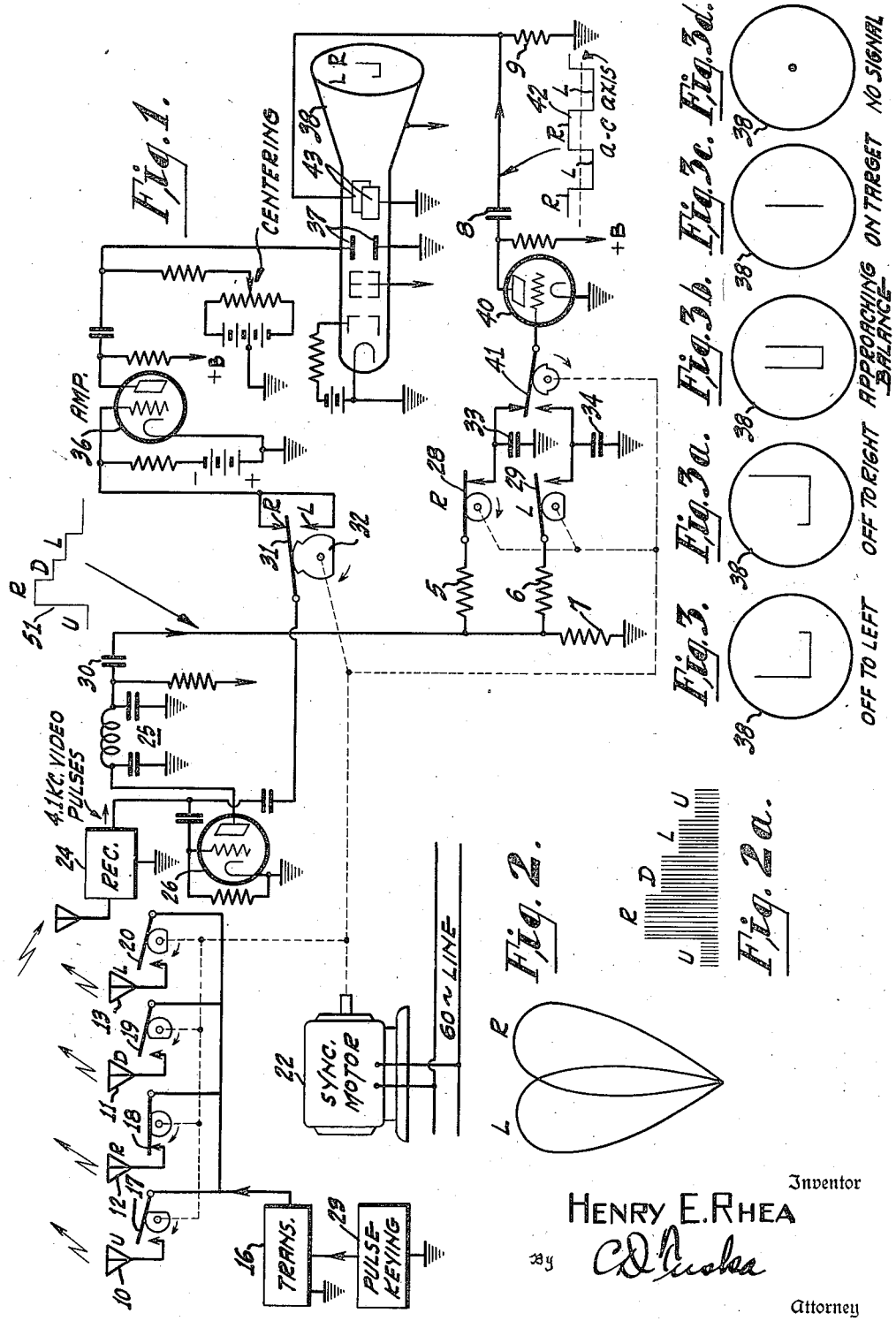

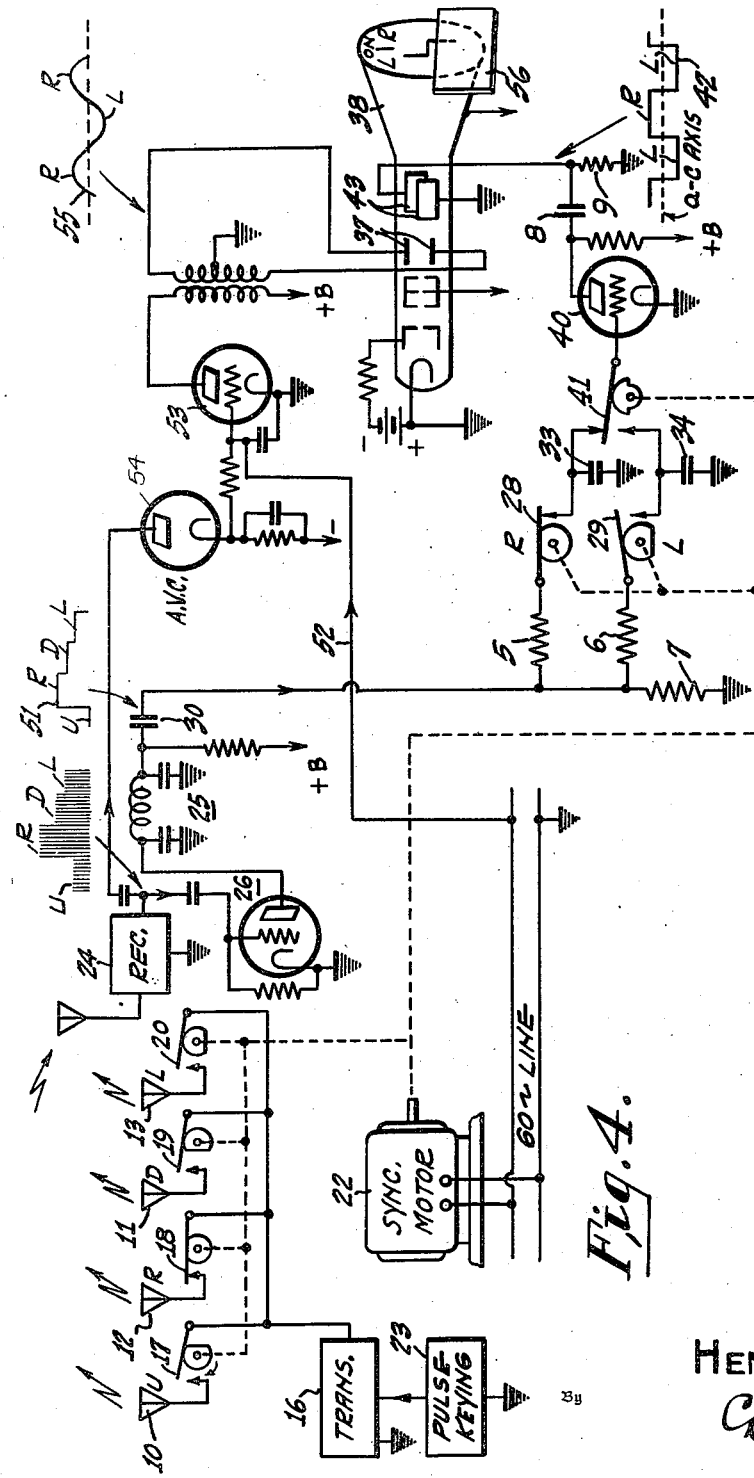
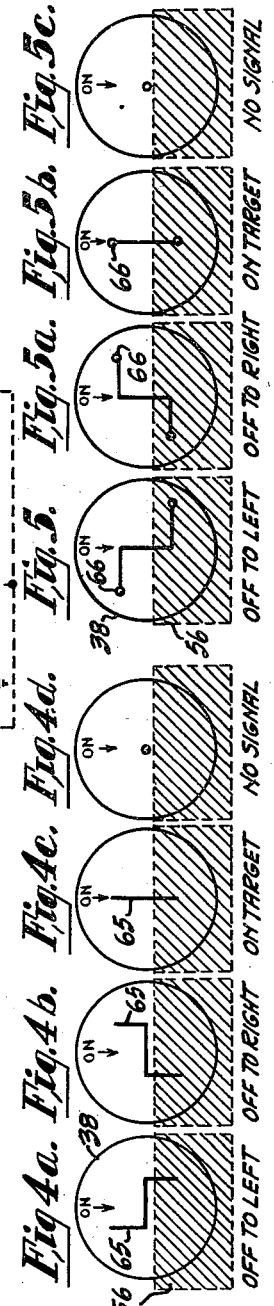

2,423,518

UNITED STATES PATENT OFFICE 2,423,518

CATHODE-RAY TUBE DIRECTION FINDER

Henry E. Rhea, Collingswood, N. J., assignor to Radio Corporation of America, a corporation of Delaware Application November 27, 1943, Serial No. 512,028

11 Claims. (Cl. 250—1.72)

My invention relates to cathode ray indicator systems and particularly to systems for indicating the position of an object with respect to a radio transmitter.

The invention will be described specifically as applied to a pulse-echo system wherein the transmitter radiates signals from antennas having overlapping directional radiation patterns, the indicator functioning to give the position of the said object with respect to the radiation patterns, and particularly to inform an operator when the object is located within the equi-signal region of the overlapping patterns.

An object of the invention is to provide an improved indicator for direction finding or object locating apparatus.

A further object of the invention is to provide an improved cathode ray indicator system for indicating the position of an object with respect to overlapping radiation patterns.

A still further object of the invention is to provide an improved indicator for radio pulse-echo apparatus.

In a preferred embodiment, the invention is applied to a pulse-echo system having a directive antenna system so designed that its radiation pattern or patterns may be rotated in both a horizontal plane and a vertical plane to search for an object such as an enemy airplane. The antenna system may consist of four directive antennas which may be keyed successively, as described, for example, in application Serial No. 259,057, filed February 28, 1939, Patent No. 2,412,702, granted December 17, 1946, in the name of Irving Wolff, and entitled Object detection and location, or an antenna system may be employed which is keyed by means of shorting condensers as described and claimed in application Serial No. 412,943, filed September 30, 1941, Patent No. 2,400,736, granted May 21, 1946, in the name of George H. Brown, and entitled Antenna systems.

In the receiver, the vertical deflecting plates of a cathode ray tube have applied to them, during the "right" and "left" antenna switching periods, the received pulses that have been reflected from the target or other object. A square wave deflecting voltage corresponding to the difference in amplitude between the "right" and "left" pulses is applied to the horizontal deflecting plates. This square wave may be obtained from a peak voltage measuring circuit that is switched in synchronism with the keying of the directive antennas. Thus, the amplitudes of the right-left vertical deflecting traces of the cathode ray are determined by the relative amplitudes of the reflected pulses in the two horizontal radiation patterns and the horizontal deflection, and thus the spacing between the vertical traces is determined by the difference in amplitude of the right-left pulses in the horizontal radiation patterns.

The invention will be better understood from the following description taken in connection with the accompanying drawing in which Figure 1 is a circuit and block diagram of one of the preferred embodiments of my invention, Figure 2 is a diagram of the radiation patterns of the right-left directive antennas employed in the system of Fig. 1.

Figure 2a is a view representing received radio pulses after demodulation in the receiver of the system of Fig. 1, Figures 3 to 3d are views of the screen end of the cathode ray tube employed in the system of Fig. 1 showing the position of the cathode ray spot for different relative positions of the transmitter radiation patterns and the object or target, Figure 4 is a circuit and block diagram of another embodiment of my invention, Figures 4a to 4d are views of the screen end of the cathode ray tube employed in the system of Fig. 4 showing the cathode ray trace for different positions of a target or the like with respect to the two radiation patterns in the horizontal plane, and Figures 5 to 5c are views corresponding to Figs. 4a to 4d, respectively, for a modification of the system shown in Fig. 4.

In the several figures, similar parts are indicated by similar reference characters.

In Fig. 1, my indicator is applied to a radio pulse-echo system comprising four directive antennas 10, 11, 12 and 13 for radiating up, down, right and left patterns, respectively, as indicated by the letters U, D, R and L. The radiation patterns for these antennas are conical patterns that overlap as indicated in Fig. 2 where the patterns marked R and L correspond to the antennas similarly marked in Fig. 1. The antennas 10, 11, 12 and 13 may be like those illustrated in the above-mentioned Wolff application, or of any other suitable type.

High frequency radio pulses are supplied successively to the U, R, D and L antennas from a transmitter 16 through cam operated switches 17, 18, 19 and 21, respectively, driven by a motor 22. The said pulses are obtained by modulating the high frequency carrier wave produced by transmitter 16 by means of keying pulses from a source 23. The source 23 may be a multivibrator supplying pulses recurring at the rate of 4.1 kilocycles per second, for example.

The receiver 24 demodulates the 4.1 kc. pulses of high frequency energy to supply 4.1 kc. "video" frequency pulses (shown in Fig. 2a) to a right-left switch 31 and to a rectifier 26 which preferably is of the peak rectifying type. The switch arm 31 is moved by a cam 32 into contact with the upper and lower switch points (indicated at R and L, respectively) during the right and left switching periods, respectively, whereby the "video" frequency pulses corresponding to these periods are applied through an amplifier 36 to the vertical deflecting plates 37 of the cathode ray tube 38. In the circuit illustrated, the rectifier 26 is a grid-leak biased peak rectifier tube which is well known in the television art. The output of the rectifier 26 is passed through a low pass filter 25 and supplied through a large capacity blocking condenser 39, through resistors 5 and 6, to cam operated switches 28 and 29, which apply right-left pulses to condensers 33 and 34, respectively. A leak resistor for the several condensers is shown at 7. The resistors 5 and 6 are provided to make the time constant of the condenser circuits long enough to smooth out and substantially eliminate the effect of any high frequency noise pulses that may be received. The output from the filter 25 is represented by the graph 51 where the four groups of filtered or integrated 4.1 kc. "video" frequency pulses of unequal amplitude are indicated at U, R, D, L.

An amplifier tube 40 has its input electrodes connected across condensers 33 and 34 alternately by a switch 41 whereby the signal output of the tube corresponds to the charges on the condensers 33 and 34 to produce the square wave 42 so long as the reflected right-left pulses differ in amplitude. The anode of the tube 40 is connected to the horizontal deflecting plates 43 of the cathode ray indicator tube 38 through a capacitor 8. A resistor 9 permits a charge to leak off the capacitor 8.

The cam switches 28, 29, 41 and 31 are driven in synchronism with the antenna switches 17, 18, 19 and 20 by the motor 22. Thus, when the "right" antenna switch 18 is closed, the corresponding "right" switch 28 of the indicator is also closed. Likewise, the switch 41 is closed in its upper position and will remain closed until the "left" switches 20 and 29 close, whereby the square wave 42 is produced. The "R" and "L" cycles of the wave 42 approach the A.-C. axis to become a straight line (zero square wave) when the right-left radiation patterns are symmetrical with respect to or "on" the target. Also, when the "right" antenna switch 18 is closed, the switch 31 is in its upper position. Thus for the condition shown in Fig. 2a, the cathode ray is deflected and held to the right by the "R" cycle of the wave 42 and deflected vertically with large amplitude by the 4.1 kc. pulses applied through the switch 31. Next, as the cams are rotated through 180 degrees, the switches 20 and 29 close and the switches 41 and 31 move to their lower positions.

The cathode ray is now deflected and held to the left by the "L" cycle of the wave 42 and deflected vertically with small amplitude by the 4.1 kc. pulses applied through the switch 31. Therefore, the right-left indication is as shown in Fig. 3a. The switching sequence in this particular example is U, R, D, L as will be apparent from the shape of the cams and from the direction of rotation indicated by the arrows. The complete switching cycle may occupy 1/60 second, for example.

The particular graph shown in Fig. 2a represents a condition where the radiation pattern of the antenna system is not centered on the target. It will be noted that the reflected pulses during the interval U are of less amplitude than during the interval D, and that during the interval R they are of greater amplitude than during the interval L. During the time switch 28 is closed, the condenser 33 is charged to a voltage equal to the peak voltage of the R group of reflected pulses; after switch 28 opens, condenser 33 retains this charge. When switch 28 next closes, the condenser 33 either acquires more charge or loses some charge if the peak amplitude of the pulses has changed. Similarly, the condenser 34 is charged by the received pulses so that the voltage thereacross corresponds to the peak amplitude of the pulses in group L. The switches 28 and 29 preferably are timed to close shortly after the beginning of intervals R and L of graph 51, respectively, and to open shortly before the end thereof. This prevents any error that might otherwise result from an unlike number of 4.1 kc. pulses in the R and L groups.

In an indicator of the character being described, it is important to avoid any possibility of a false reading resulting from lack of incoming signal. This possibility is avoided with the circuit of Fig. 1 since the indication becomes a spot on the fluorescent screen of the tube 38 as shown in Fig. 3d if there is no incoming signal.

From the foregoing, it will be understood that in Figs. 3 to 3e the different positions and lengths of the cathode ray traces give the following information: Fig. 3 indicates that the object or target is to the left of the center line of the transmitter radiation pattern; Fig. 3a indicates the target is to the right of the point aimed at; Fig. 3b indicates the target is nearly on center horizontally; and Fig. 3c indicates it is on center; that is, the antenna right-left radiation pattern is now "on" the target. If the incoming signal disappears for any reason, the only indication is a spot as shown in Fig. 3d.

One important feature of my indicator system is that the transmitter radiation pattern can always be centered on a target regardless of variations in the incoming signal strength since such variations will produce the same percentage change in all the voltages on the deflecting plates. It may be noted that while the use of a peak rectifier such as rectifier 26 is preferred, it is possible to employ other rectifiers such as one having an output that is a measure of the area or power of a pulse.

It will be understood that an indicating system similar to the one described above may be employed for the "up-down" indications.

In Fig. 4 there is shown an embodiment of the invention that gives left-right indications of the character shown in Figs. 4a to 4c. The left-right horizontal deflections of the cathode ray are obtained as previously described.

The vertical trace is obtained by applying to the deflecting plates 37 a sine wave 55 that has an amplitude proportional to the signal strength. This may be done by supplying a voltage from the 60 cycle line over a conductor 52 to the deflecting plates 37 through an amplifier 53. The gain of the amplifier 53 is controlled in accordance with the strength of the incoming signal by means of an automatic volume control circuit comprising a diode 54 connected to the output of the receiver 24. Since the motor 22 drives the cam operated switches synchronously with the 60 cycle power supply, the "R" and "L" cycles of the sine wave 55 and of the square wave 42 will occur simultaneously. In the example shown, the cathode ray is deflected up by the "R" cycle of the sine wave 55 and down by the "L" cycle. The down deflection preferably is masked off as indicated at 56 on the drawing.

The position of the vertical trace 65 above the mask 56 depends upon the amplitude and phase of the square wave 42 with respect to its A.-C. axis; these, in turn, depend upon the relative amplitudes of the received pulses during the right and left switching periods. The amplitude of wave 42 becomes zero when the pulses of periods R and L become equal in amplitude as they do when the antenna radiation patterns come to the "on target" position. The phase of the wave 42 reverses when the radiation patterns swing past the "on target" position. Therefore, as shown in Figs. 4a to 4c, the vertical indicating trace 65 appears on the fluorescent screen either to the right or to the left of center depending upon the phase of the square wave 42, and it moves closer to center as the radiation patterns are brought closer to the "on target" position. If the signal fades away, the cathode ray indication is reduced to a spot as shown in Fig. 4d.

Figs. 5 to 5c show the type of indication that may be obtained by differentiating the square wave 42 before it is applied to the deflecting plates 43. This may be done by giving the capacitor 8 a small capacity value so that only the high frequency components of the wave 42 are passed. The sine wave 55 is then phased with respect to the wave 42 so that the pulses of the differentiated wave occur at the instant the wave 55 has a suitable amplitude (an amplitude other than zero) with respect to its A.-C. axis. The resulting indication is a spot 66 that is produced during the occurrence of the differentiated wave pulse that occurs during the sine wave cycle that deflects the cathode ray upwardly.

I claim as my invention:

1. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of horizontal deflecting elements and a pair of vertical deflecting elements, means for obtaining a rectangular wave having a peak-to-peak amplitude that is a measure of the relative amplitude of the two groups of reflected pulses in said plane, means for applying said rectangular wave to one pair of said deflecting elements, and means for applying to the other pair of deflecting elements a deflecting voltage which is in synchronism with said signal wave.

2. An indicator for a radio pulse-echo system of the type comprising a plurality of directive antennas having overlapping radiation patterns in a certain plane, a radio pulse transmitter unit and a radio pulse receiver unit, means for switching said antennas successively to at least one of said units, said indicator comprising a cathode ray tube having a pair of deflecting elements, means for obtaining an electrical wave that is a measure of the relative amplitudes of the two groups of reflected pulses in said plane, means for applying said wave to said pair of deflecting elements to deflect the cathode ray of said tube to opposite extreme positions, and means for deflecting said cathode ray substantially at right angles to the deflection produced by said wave while said cathode ray is in said extreme positions of deflection.

3. The invention according to claim 2 wherein said last means comprises a second pair of deflecting elements, and means for applying the reflected radio pulses to said second pair of elements.

4. The invention according to claim 2 wherein said electrical wave is a square wave.

5. The invention according to claim 2 wherein said electrical wave is a derivative of a square wave.

6. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of deflecting elements, means for obtaining a square wave that is a measure of the relative amplitudes of the two groups of reflected pulses in said plane, means for applying said square wave to said pair of deflecting elements, and means for deflecting the cathode ray of said tube substantially at right angles to and in synchronism with the deflection produced by said square wave.

7. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of deflecting elements, means comprising two storage capacitors for obtaining thereacross two voltages, respectively, which are a measure of the amplitudes of the two groups of reflected pulses in said plane, switching means for converting said two voltages to a square wave that is a measure of the relative amplitudes of the two groups of reflected pulses in said plane, means for applying said square wave to said pair of deflecting elements, and means for deflecting the cathode ray of said tube substantially at right angles to and in synchronism with the deflection produced by said square wave.

8. The invention according to claim 7 wherein said last means includes a second pair of deflecting elements and wherein means is provided for applying to said second pair of elements a deflecting voltage that decreases in amplitude in response to a decrease in the amplitude of the received signal.

9. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of horizontal deflecting elements and a pair of vertical deflecting elements, means for obtaining a square wave that is a measure of the relative amplitudes of the two groups of reflected pulses in said plane, means for applying said square wave to one pair of said deflecting elements, and means for applying said two groups of reflected pulses to the other pair of deflecting elements.

10. In a radio pulse-echo system, a plurality of directive antennas having overlapping radiation patterns in the horizontal plane and having overlapping radiation patterns in the vertical plane, a radio pulse transmitter unit and a radio receiver unit, means for switching said antennas successively to at least one of said units, a cathode ray tube indicator having a pair of horizontal deflecting elements and a pair of vertical deflecting elements, means for obtaining a square wave that is a measure of the relative amplitudes of the two groups of reflected pulses in the horizontal plane, said last means including switching means operated in synchronism with said antenna switching, means for applying said square wave to said horizontal deflecting elements, and means for applying said two groups of reflected pulses to the vertical deflecting elements.

11. In combination, means for transmitting radio signals and means for receiving them after reflection from a reflecting object, at least one of said means including an assembly of directive antennas having overlapping radiation patterns in a certain plane, switching means for making said patterns effective successively to supply signal to a receiving circuit, said radiation patterns having characteristics such that the received signal differs in strength for the successive radiation patterns in accordance with the displacement of said radiation patterns with respect to said reflecting object, a pair of capacitors included in said receiving circuit, receiver switching means synchronized with the antenna assembly switching means, means comprising said synchronized switching means and said receiving means for charging each of said capacitors in accordance with the amplitude of the received signal during the intervals that each of said radiation patterns, respectively, is effective to supply signal to the receiving means, a cathode ray tube indicator having two pairs of deflecting elements that are angularly displaced with respect to each other, means for applying to one pair of said deflecting elements a square wave having a peak-to-peak amplitude proportional in amplitude to the voltages across said capacitors, and means for applying a deflecting voltage to the other pair of deflecting elements synchronous with said square wave.

HENRY E. RHEA.